(12) United States Patent
Baltaxe et al.

(10) Patent No.: US 11,046,273 B2
(45) Date of Patent: Jun. 29, 2021

(54) SEAT BELT STATUS DETERMINING SYSTEM AND METHOD

(71) Applicant: GM GLOBAL TECHNOLOGY OPERATIONS LLC, Detroit, MI (US)

(72) Inventors: Michael Baltaxe, Raanana (IL); Ruben Mergui, Herzliya (IL); Kobi Nistel, Herzliya (IL); Gila Kamhi, Zichron Yaakov (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 16/253,312

(22) Filed: Jan. 22, 2019

(65) Prior Publication Data

US 2020/0231109 A1    Jul. 23, 2020

(51) Int. Cl.
*B60R 21/015* (2006.01)
*B60R 22/48* (2006.01)
(Continued)

(52) U.S. Cl.
CPC ......... *B60R 21/01538* (2014.10); *B60Q 9/00* (2013.01); *B60R 21/01546* (2014.10);
(Continued)

(58) Field of Classification Search
CPC ........... G06K 9/00832; G06K 9/00838; G06K 9/00845; G06K 9/6256; G06K 9/626; G06K 9/00362; G06K 9/6267; G06K 9/6268; G06K 9/6279; G06K 9/6285; B60R 21/01512; B60R 21/01538;
(Continued)

(56) References Cited

U.S. PATENT DOCUMENTS 6,662,092 B2   12/2003   Wang et al.
6,726,260 B1    4/2004   Wang et al.
(Continued)

FOREIGN PATENT DOCUMENTS

| DE | 10133759 A1 | 1/2003 |
|---|---|---|
| DE | 102006040244 B3 | 8/2007 |
| DE | 102015120811 A1 | 6/2016 |

OTHER PUBLICATIONS

Magnusson, Evaluating Deep Learning Algorithms Jun. 19, 2018, Linköping University, Department of Computer and Information Science, Software and Systems (Year: 2018).*

(Continued)

*Primary Examiner* — Kevin P Mahne
(74) *Attorney, Agent, or Firm* — Cantor Colburn LLP

(57) ABSTRACT

A seat belt status determining system and method for a vehicle that evaluate a seat belt and determine if it is buckled and if it is properly routed on a passenger. In order to evaluate the seat belt status, the system and method use seat belt sensors and cameras inside the vehicle cabin to generate data that is then analyzed in conjunction with machine learning techniques (e.g., supervised machine learning techniques implemented through the use of neural networks) to classify the seat belt status into one or more categories, such as: passenger not present, passenger present/seat belt not being worn, passenger present/seat belt being worn improperly, passenger present/seat belt being worn properly, and blocked view.

19 Claims, 3 Drawing Sheets

(51) Int. Cl.
*G06N 3/08* (2006.01)
*G05D 1/00* (2006.01)
*B60Q 9/00* (2006.01)
*G06N 3/04* (2006.01)
*G06K 9/00* (2006.01)
*G06K 9/62* (2006.01)

(52) U.S. Cl.
CPC ............ *B60R 22/48* (2013.01); *G05D 1/0088* (2013.01); *G06K 9/00832* (2013.01); *G06K 9/6267* (2013.01); *G06N 3/04* (2013.01); *G06N 3/08* (2013.01); *B60R 2022/4816* (2013.01); *B60R 2022/4866* (2013.01)

(58) Field of Classification Search
CPC ........ B60R 21/01544; B60R 21/01546; B60R 2022/4816; B60R 2022/485; B60R 2022/4866; B60R 22/48; G06N 3/02; G06N 3/04; G06N 3/08; G05D 1/0088; B60Q 9/00; B60N 2/002
See application file for complete search history.

(56) References Cited

U.S. PATENT DOCUMENTS

| | | |
|---|---|---|
| 6,748,307 B1 | 6/2004 | Sala et al. |
| 6,756,889 B2 | 6/2004 | Sala et al. |
| 6,816,766 B2 | 11/2004 | Sala et al. |
| 6,999,863 B2 | 2/2006 | Neal et al. |
| 7,159,901 B2 | 1/2007 | Wang et al. |
| 7,232,178 B2 | 6/2007 | Neal et al. |
| 7,334,656 B2 | 2/2008 | Kramarczyk et al. |
| 7,369,928 B2 | 5/2008 | Wang et al. |
| 7,401,846 B2 | 7/2008 | Browne et al. |
| 7,997,620 B1 | 8/2011 | Dong et al. |
| 8,135,506 B2 | 3/2012 | Hansen et al. |
| 8,226,119 B2 | 7/2012 | Dong et al. |
| 8,335,616 B2 | 12/2012 | Neal et al. |
| 8,339,268 B2 | 12/2012 | Deng et al. |
| 8,606,465 B2 | 12/2013 | Wang et al. |
| 8,727,377 B2 | 5/2014 | Wang |
| 8,967,665 B1 | 3/2015 | Lin et al. |
| 9,150,238 B2 | 10/2015 | Alcazar et al. |
| 9,415,746 B1 * | 8/2016 | Johnson ............. G06K 9/00288 |
| 9,511,683 B2 | 12/2016 | Sala et al. |
| 9,598,037 B2 | 3/2017 | Neal et al. |
| 2003/0234524 A1 * | 12/2003 | Roychoudhury ........................... B60R 21/01512 280/735 |
| 2004/0220705 A1 * | 11/2004 | Basir ................. B60R 21/01538 701/1 |
| 2009/0058061 A1 * | 3/2009 | Fuisz ..................... B60R 22/48 280/801.1 |
| 2010/0121536 A1 | 5/2010 | Wang et al. |
| 2012/0053794 A1 | 3/2012 | Alcazar et al. |
| 2016/0046261 A1 * | 2/2016 | Gulash ................ G05D 1/0055 701/23 |
| 2016/0159320 A1 * | 6/2016 | Andreen ................ B60R 22/48 382/103 |
| 2018/0326944 A1 * | 11/2018 | Cech .................. G06K 9/00838 |
| 2019/0225186 A1 * | 7/2019 | Szawarski .......... G06K 9/00845 |
| 2019/0325605 A1 * | 10/2019 | Ye ............................ G06T 7/73 |

OTHER PUBLICATIONS

Office Action issued in German Application No. 102019134141; Application Filing Date Dec. 12, 2019; dated Feb. 1, 2021 (7 pages).

* cited by examiner

SEAT BELT STATUS DETERMINING SYSTEM AND METHOD

TECHNICAL FIELD

The exemplary embodiments described herein generally relate to a system and method for use in a vehicle and, more particularly, to a seat belt status determining system and method that use one or more camera(s) and sensor(s) to determine if a seat belt is properly buckled and routed.

INTRODUCTION

Improving the driving experience, in terms of safety and comfort, is a common objective for automotive manufacturers and users alike.

Seat belts are a standard safety device found in almost all vehicles. Despite their widespread adoption, seat belts are not always worn and used properly by passengers. For example, there are still instances when a passenger either forgets or chooses not to wear a seat belt, or wears the seat belt improperly in terms of its routing. As one would expect, in these instances, the seat belt is generally less effective. For most seat belt configurations, the proper way to wear and route the seat belt includes having a lower or lap belt across an upper part of the passenger's hips and an upper or shoulder belt across the passenger's shoulder and chest.

The seat belt status determining system and method disclosed herein are designed to address these issues.

SUMMARY

According to one aspect, there is provided a seat belt status determining method for use with a vehicle having one or more vehicle camera(s) and one or more seat belt sensor(s). The method may comprise the following steps: gathering camera image data with the vehicle camera(s); gathering seat belt data with the seat belt sensor(s); and performing a seat belt classification process, the seat belt classification process receives the camera image data as input and provides a seat belt classification as output, wherein the seat belt classification process classifies an image from the camera image data into one more classification(s) that are representative of a status of the seat belt.

According to various embodiments, the seat belt status determining method may further include any one of the following features or any technically-feasible combination of some or all of these features:

- the camera image data gathering step further comprises gathering camera image data with the vehicle camera(s) and providing the camera image data to a vehicle data processing module over a vehicle communications network, the camera image data includes images that show a seat area in a cabin of the vehicle;
- the seat belt data gathering step further comprises gathering seat belt data with the seat belt sensor(s) and providing the seat belt data to a vehicle data processing module over a vehicle communications network, the seat belt data includes signals that indicate whether a seat belt is buckled or not buckled;
- the performing step further comprises performing the seat belt classification process by pre-processing the camera image data so that the pre-processed camera image data is reduced in size and is standardized;
- the pre-processing step further comprises reducing the size of camera image data by cropping a region of interest (ROI) from an image in the camera image data, where the ROI corresponds to an expected location of a passenger and seat belt;
- the pre-processing step further comprises standardizing the camera image data by performing one or more standardization technique(s) selected from the list consisting of: horizontally flipping one or more image(s) so that they have a standard orientation, normalizing pixels so that they have an intensity within a standard range, converting data for one or more image(s) so that they have a standard number of bits/pixel, or scaling one or more image(s) so that they have a standard size;
- the performing step further comprises performing a scenario classification process as part of the seat belt classification process, the scenario classification process receives pre-processed camera image data as input and provides a scenario classification as output, the scenario classification process classifies an image from the pre-processed camera image data into one more classification(s) that are representative of a passenger not present, a passenger present, or a blocked view;
- the scenario classification process further comprises using a neural network to predict which of the scenario classification(s) best represents the image from the pre-processed camera image data and does so on an image-wise basis;
- the scenario classification output includes a plurality of probability values, each of the probability values is between [0, 1] and represents a probability that the image from the pre-processed camera image data is representative of a particular scenario, and the sum of the probability values for all of the possible scenarios equals 1;
- the neural network is a convolutional neural network having an Xception type architecture and is trained using an Adam optimizer;
- the scenario classification process further comprises using one or more data augmentation technique(s) to supplement training data for the neural network, the data augmentation technique(s) includes one or more technique(s) selected from the list consisting of: an image rotation data augmentation technique, an image crop data augmentation technique, or an image brightness data augmentation technique;
- the performing step further comprises performing the seat belt classification process which includes a seat belt segmentation process, the seat belt segmentation process receives pre-processed camera image data as input and provides a segmented seat belt as output, the seat belt segmentation process identifies a plurality of seat belt pixels from an image in the pre-processed camera image data;
- the seat belt segmentation process further comprises using a neural network to predict if each pixel or group of pixel(s) in the image corresponds to a seat belt or not and does so on a pixel-wise basis;
- the segmented seat belt output is a binary image where each of the pixel(s) is assigned a "0" or "1" depending on whether or not it is a seat belt pixel;
- the neural network is a fully convolutional neural network having a DenseNet type architecture;
- the performing step further comprises performing the seat belt classification process which includes a passenger pose estimation process, the passenger pose estimation process receives pre-processed camera image data as input and provides a passenger pose estimation as output, the passenger pose estimation process estimates a location of one or more passenger body part(s) in an image in the pre-processed camera image data; the passenger pose estimation process further comprises using a neural network to estimate the location of the body part(s) in the image; the performing step further comprises performing the seat belt classification process which includes both a seat belt segmentation process and a passenger pose estimation process, the seat belt segmentation process outputs a segmented seat belt that includes a plurality of seat belt pixels, the passenger pose estimation process outputs a passenger pose estimation that estimates a location of one or more passenger body part(s), and wherein the seat belt classification process compares the plurality of seat belt pixels to the estimated location the passenger body part(s) and, when a portion of the seat belt extends between a neck and shoulder of the passenger body part(s), the seat belt classification process determines that a passenger is present and the seat belt is being worn properly; the seat belt classification process classifies the image from the camera image data into one more classification(s) selected from the list consisting of: passenger not present, blocked view, passenger present/seat belt being worn properly, or passenger present/seat belt being worn improperly; further comprising the step of: carrying out one or more remedial action(s) when the seat belt classification process determines that a passenger is present but the seat belt is being worn improperly, the remedial action(s) are selected from the list consisting of: sending a visual alert to the passenger, sending an audible alert to the passenger, or automatically stopping the vehicle when the vehicle is an autonomous or semi-autonomous vehicle.

According to another aspect, there is provided a seat belt status determining system for use with a vehicle, comprising: one or more vehicle camera(s) that are mounted inside the vehicle and provide camera image data; one or more seat belt sensor(s) that are mounted inside the vehicle and provide seat belt data; a vehicle data processing module that is mounted on the vehicle and is coupled to the vehicle camera (a) to receive the camera image data and is coupled to the seat belt senor(s) to receive the seat belt data; and a computer program product configured for installation on the vehicle data processing module. The computer program product includes electronic instructions that, when executed by the vehicle data processing module, cause the vehicle data processing module to carry out the following step: performing a seat belt classification process, the seat belt classification process uses the camera image data as input and provides a seat belt classification as output, wherein the seat belt classification process classifies an image from the camera image data into one more classification(s) that are representative of a status of the seat belt.

BRIEF DESCRIPTION OF THE DRAWINGS

One or more exemplary embodiments will hereinafter be described in conjunction with the appended drawings, wherein like designations denote like elements, and wherein.

DETAILED DESCRIPTION OF THE ILLUSTRATED EMBODIMENT(S)

The seat belt status determining system and method described herein are designed to evaluate a seat belt and determine if it is buckled and if it is properly routed on a passenger. Conventional systems typically only determine if a seat belt is buckled or is being worn, but do not provide feedback in terms of how the seat belt is routed on the passenger (i.e., if it is being worn properly). In order to evaluate the seat belt status, the present system and method use both seat belt sensors and cameras inside the vehicle cabin to generate data that is then analyzed in conjunction with machine learning techniques (e.g., supervised machine learning techniques implemented through the use of neural networks) to classify the seat belt status into one or more categories, such as: passenger not present, passenger present/seat belt not being worn, passenger present/seat belt being worn improperly, passenger present/seat belt being worn properly, and blocked view. It is also possible for the present system and method to perform such an evaluation without the need for weight sensors in the seat and without having to mark or otherwise alter the seat belt, so that the present system and method can be used in a variety of scenarios with existing vehicle equipment so as to avoid costly modifications.

Figure 1:
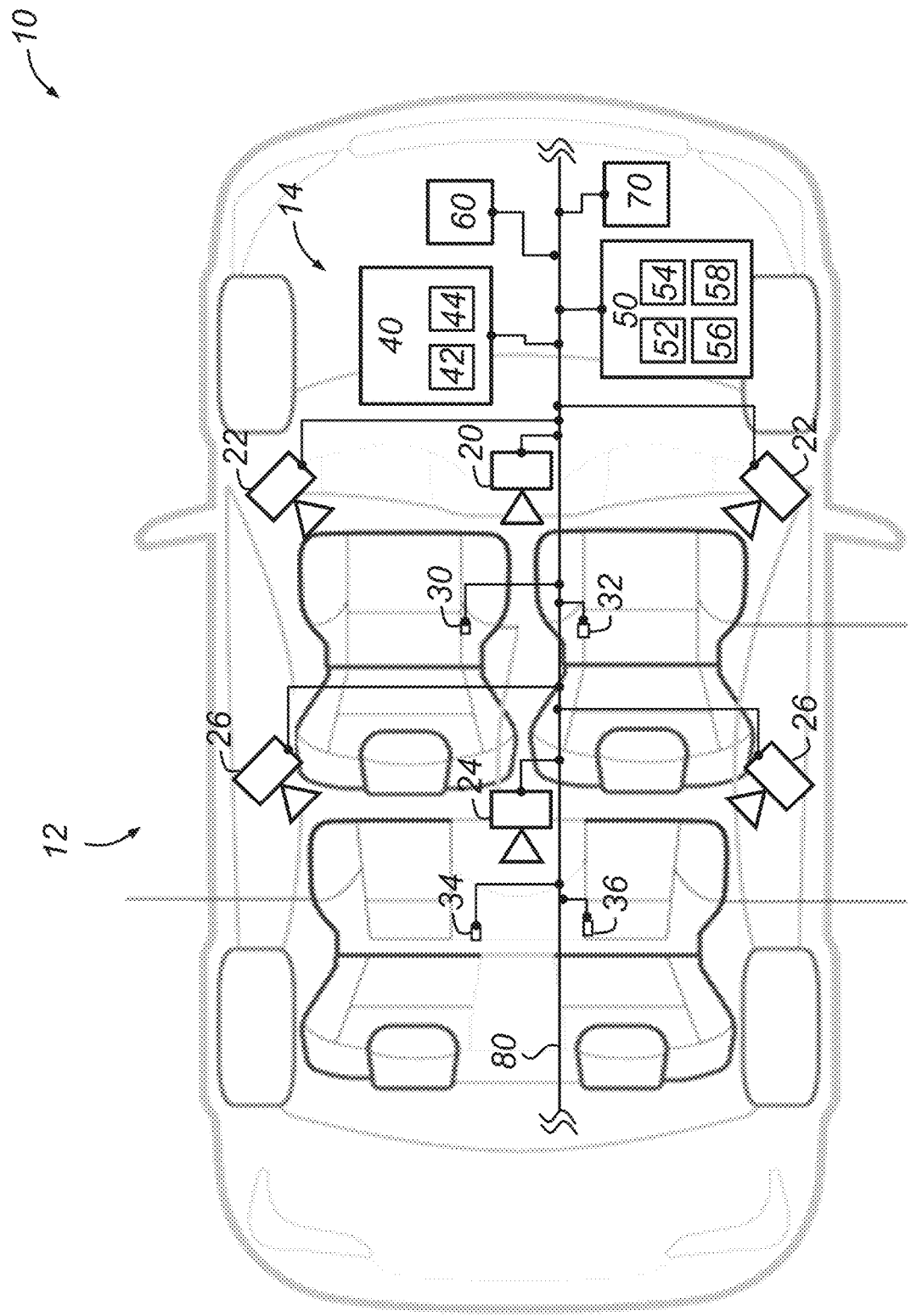
FIG. 1 is a schematic block diagram of an embodiment of a seat belt status determining system installed on a vehicle.

Turning now to FIG. 1, there is shown an example of a vehicle 10 having a seat belt status determining system 12 for improving passenger safety, where the system is capable of carrying out the seat belt status determining method described below. According to this example, system 12 includes vehicle hardware 14 that has one or more vehicle camera(s) 20-26, seat belt sensors 30-36, a vehicle data processing module 40, a vehicle communications module 50, a vehicle autonomous driving module 60, other vehicle electronic modules 70, as well as any other suitable combination of systems, modules, devices, components, hardware, software, etc. that are needed to carry out the method, steps and/or functionality described herein. The various components of the vehicle hardware 14 may be connected by a vehicle communication network 80 (e.g., a wired vehicle communications bus, a wireless vehicle communications network, or some other suitable communications network). Vehicle 10 may be a traditional non-autonomous vehicle or an autonomous or semi-autonomous vehicle. The phrase "autonomous or semi-autonomous vehicles," as well as any derivative terms, broadly means any vehicle capable of automatically performing a driving-related action or function, without a driver request, and includes actions falling within levels 1-5 of the Society of Automotive Engineers (SAE) International classification system.

Skilled artisans will appreciate that the schematic block diagram of the vehicle hardware 14 is simply meant to illustrate some of the more relevant hardware components used with the present method and it is not meant to be an exact or exhaustive representation of the vehicle hardware that would typically be found on such a vehicle. Furthermore, the structure or architecture of the vehicle hardware 14 may vary substantially from that illustrated in FIG. 1 (e.g., cameras 20-26, seat belt sensors 30-36 and/or modules 40-70 could be integrated or otherwise combined with one other or with other equipment, as opposed to all being separate stand-alone components). Because of the countless number of potential arrangements and for the sake of brevity and clarity, the vehicle hardware 14 is described in conjunction with the illustrated embodiment of FIG. 1, but it should be appreciated that the present system and method are not limited to such.

Vehicle camera(s) 20-26 are mounted inside of the vehicle cabin and provide the present system and method with camera image data. Although the following examples describe the vehicle cameras 20-26 in the context of video cameras that generate corresponding images or still frames, these cameras may include any suitable camera or vision system known or used in the industry, so long as it is capable of gathering images, representations and/or other information regarding the environment inside of the vehicle cabin. Depending on the particular application, one or more of the vehicle camera(s) 20-26 may include: a still camera, a video camera; a BW and/or a color camera; an analog and/or digital camera; a wide and/or narrow field-of-view (FOV) camera; and may be part of a mono and/or stereo system, to cite a few possibilities. According to a non-limiting example, the vehicle hardware 14 includes one or more camera(s) 20-26 that are passenger-facing CMOS video cameras and provide camera image data to the rest of system 12, including the vehicle data processing module 40, via the vehicle communications network 80. Each of the camera(s) 20-26 may be a wide angle camera (e.g., with a FOV of about 140° or more) so that a full view or nearly full view of the passenger in question can be obtained. The camera image data outputted by camera(s) 20-26 may include raw video or still image data (i.e., with no or little pre-processing), or it may include pre-processed video or still image data in cases where the camera has its own image processing resources and performs pre-processing on the captured images before outputting them as camera image data. Other possibilities also exist.

Vehicle camera(s) 20-26 may be arranged or set up in the vehicle cabin according to any number of different configurations. For instance, in a vehicle without a sunroof, the present system may only use a single camera 20, 24 to monitor an entire row of seats, where camera 20, 24 can be mounted in the vehicle roof or headliner at a central position located between driver-side and passenger-side seats. In such a configuration, the camera 20, 24 would need a sufficiently wide FOV so that it could monitor or view multiple seats at the same time. In this configuration, camera 20 could be installed in a rear view mirror assembly, camera 24 could be mounted in an infotainment unit or the like, or they could be mounted in other centrally located positions. On the other hand, if the vehicle has a sunroof or other centrally located object that prevents such an arrangement, the present system may have two or more side cameras 22, 26 mounted in the vehicle cabin at side positions closer to the vehicle's A- and B-pillars, respectively, that would replace the single centrally mounted camera 20, 24. Thus, it is possible for the seat belt status determining system 12 to have a single camera for first and/or second row monitoring, multiple cameras for first and/or second row monitoring, or some other configuration suitable for the cabin layout of that particular vehicle. According to one example, the system includes a single centrally mounted camera 20 to monitor the first row and a single centrally mounted camera 24 to monitor the second row. Other configurations and combinations of cameras, including ones with more or less cameras, different mounting locations and third row monitoring, are certainly possible.

Seat belt sensors 30-36 are mounted inside of the vehicle cabin and are coupled to each of the seat belts in question so as to provide the present system and method with seat belt data. Although the following example describes seat belt sensors 30-36 in the context of contactless electromagnetic sensors, it should be appreciated that these are just examples, as seat belt sensors 30-36 are not limited to any particular kind of sensor. Depending on the particular application, one or more of the seat belt sensor(s) 30-36 may include: a contact and/or contactless sensor, an electromagnetic sensor (e.g., a Hall effect sensor or a reed switch sensor), or may be a part of an occupant classification system (OCS), to cite a few possibilities. According to a non-limiting example, each of the seat belt sensors 30-36 includes a contactless Hall effect sensor where a magnetic element is located on either the seat belt tongue (the insertion piece) or the seat belt buckle (the reception piece) and a corresponding sensor element is located on the other of those two pieces. When the seat belt tongue is properly inserted into the seat belt buckle, the presence of a magnetic field produced by the magnetic element will cause the sensor element to output a voltage indicating its operational state, as is widely known and understood in the art. The exact format or structure of the seat belt data outputted by the seat belt sensors 30-36 can vary and is not limited to any particular embodiment. Of course, other possibilities for the seat belt sensors also exist.

Vehicle data processing module 40, vehicle communications module 50, vehicle autonomous driving module 60, as well as the other vehicle electronic modules 70 may include any suitable components and be arranged according to any suitable configurations known or used in the industry. Because the particular architectures of modules 40-70 are not critical and because these modules can be provided according to so many different embodiments, the following description of components of module 40 can apply to any of the modules 40-70, except for where stated otherwise. For instance, each of the modules 40-70 may include one or more processing device(s) 42, memory device(s) 44, I/O device(s), as well as any other hardware and/or software typically found on such modules. The processing device 42 can be any type of device capable of processing electronic instructions including microprocessors, microcontrollers, host processors, controllers, vehicle communication processors, General Processing Unit (GPU), accelerators, Field Programmable Gated Arrays (FPGA), and Application Specific Integrated Circuits (ASICs), to cite a few possibilities. It can be a dedicated processor used only for module 40 or can be shared with other vehicle systems, modules, devices, components, etc. The processing device 42 can execute various types of electronic instructions, such as software and/or firmware programs stored in the memory device 44, which enable the module 40 to carry out various functionality. The memory device 44 can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. In one example, the processing device 42 executes programs or processes data and the memory device 44 stores programs or other data in order to help carry out or support at least a part of the present method.

Vehicle data processing module 40 receives camera image data from one or more vehicle camera(s) 20-26 and seat belt data from one or more seat belt sensor(s) 30-36, and may be configured to evaluate, analyze and/or otherwise process this input before providing seat belt status information as output, as explained below. Vehicle data processing module 40 may be indirectly or directly connected to the vehicle camera(s) 20-26 and the seat belt sensor(s) 30-36, as well as any combination of the other modules 50-70 (e.g., via vehicle communications network 80). It is possible for the vehicle data processing module 40 to be integrated or combined with the vehicle camera(s) 20-26 and/or the seat belt sensor(s) 30-36 so that they are part of a single packaged module or unit, or it is possible for the module 40 to be combined with any number of other systems, modules, devices and/or components in the vehicle.

Vehicle communications module 50 provides the vehicle with short range and/or long range wireless communication capabilities so that the vehicle can communicate and exchange data with various devices and systems, including other vehicles or a back-end or cloud-based facility used with autonomous or semi-autonomous vehicles, for example. For instance, vehicle communications module 50 may include a short range wireless circuit that enables short range wireless communications (e.g., Bluetooth™, other IEEE 802.15 communications, Wi-Fi™, other IEEE 802.11 communications, vehicle-to-vehicle communications, etc.). Module 50 may also include a cellular chipset and/or a vehicle telematics unit that enables long range wireless communications with a back-end facility or other remotely located entity (e.g., cellular, telematics communications, etc.). According to one non-limiting example, the vehicle communications module 50 includes processing and memory devices 52, 54, similar to those mentioned above, a short range wireless circuit 56, a long range wireless circuit 58 in the form of a cellular chipset, and one or more antenna(s). Vehicle communications module 50 may be indirectly or directly connected to the vehicle camera(s) 20-26 and seat belt sensor(s) 30-36, as well as any combination of the other modules 40, 60, 70 (e.g., via vehicle communications network 80). It is possible for the module 50 to be combined with any number of other systems, modules, devices and/or components in the vehicle.

Vehicle autonomous driving module 60 is an optional component and provides the vehicle with autonomous and/or semi-autonomous driving capabilities and, depending on the particular embodiment, may be a single module or unit or a combination of modules or units. The particular arrangement, configuration and/or architecture of the vehicle autonomous driving module 60 is not imperative, so long as the module helps enable the vehicle to carry out autonomous and/or semi-autonomous driving functions. Vehicle autonomous driving module 60 may be indirectly or directly connected to the vehicle camera(s) 20-26 and seat belt sensor(s) 30-36, as well as any combination of the other modules 40, 50, 70 (e.g., via vehicle communications network 80). It is possible for the module 60 to be combined with any number of other systems, modules, devices and/or components in the vehicle or, in the alternative, for module 60 to be omitted altogether (as mentioned above, this is an optional component).

Vehicle electronic modules 70 may include any other suitable modules needed to help implement the present method. For instance, module 70 may include any combination of an infotainment module, a powertrain control module (PCM), an engine control module (ECM), a transmission control module (TCM), a body control module (BCM), a traction control or stability control module, a cruise control module, a steering control module, a brake control module, etc. As with the previous modules, vehicle electronic module 70 may be indirectly or directly connected to the vehicle camera(s) 20-26 and seat belt sensor(s) 30-36, as well as any combination of the other modules 40, 50, 60 (e.g., via vehicle communications network 80). It is possible for the module 70 to be combined with any number of other systems, modules, devices and/or components in the vehicle.

Figure 2:
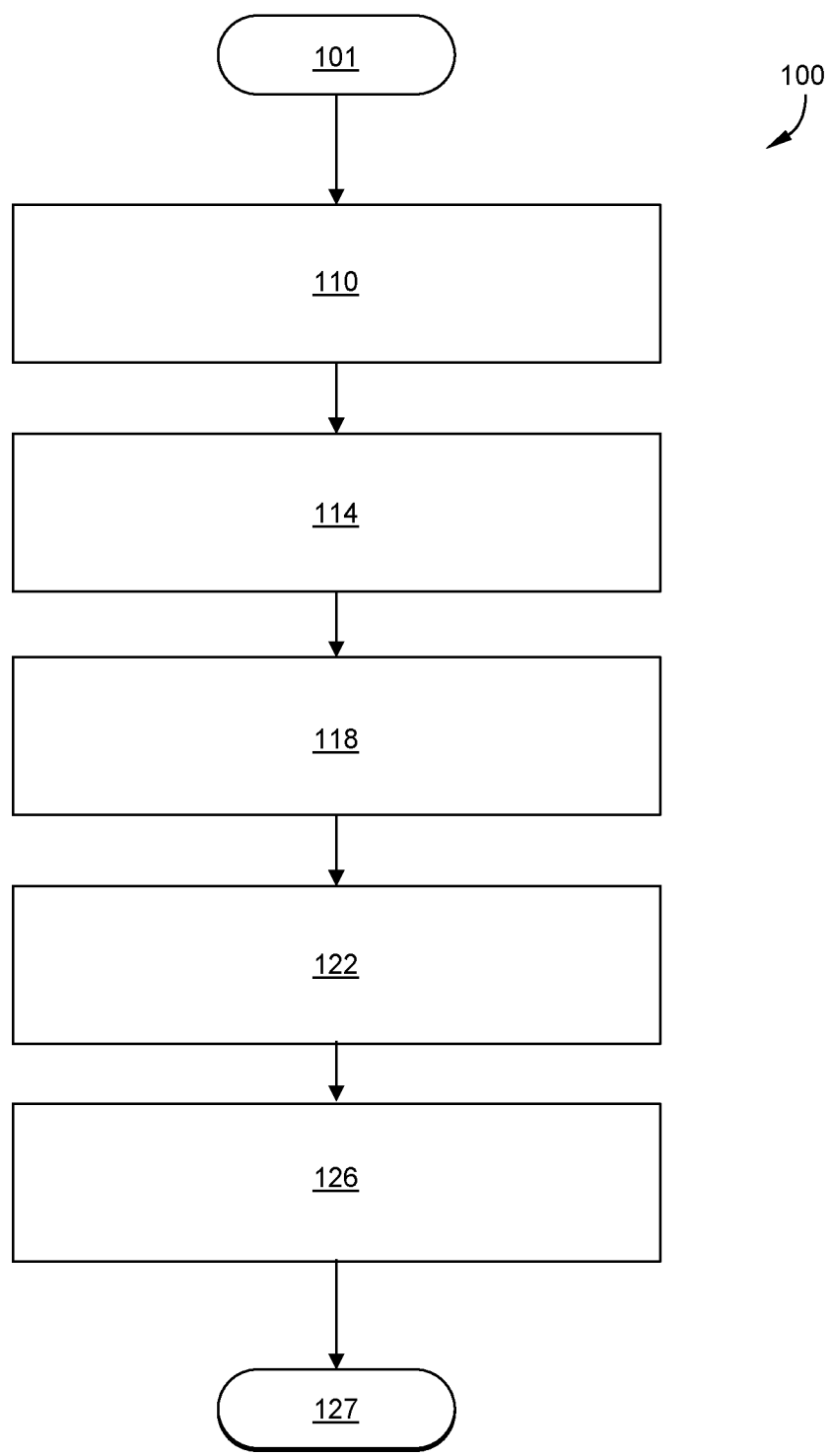
FIG. 2 is a flowchart depicting an embodiment of a seat belt status determining method that may be used with the system of FIG. 1.

Turning now to the flowchart of FIG. 2, there is shown an example of the seat belt status determining method 100 that uses camera image data and seat belt data in conjunction with machine learning techniques to evaluate one or more seat area(s) inside the vehicle cabin. Assuming that there is a passenger in the seat and the images of the seat area are not blocked or otherwise occluded by some type of object (e.g., a blanket laying overtop of the passenger so that the seat belt is obstructed), the method can determine if the seat belt is buckled and routed properly across the passenger. According to one non-limiting example of method 100, the method first gathers camera image data and seat belt data, then the method performs a seat belt classification process (e.g., a multi-step computer vision algorithm utilizing machine learning techniques), and then the output of the seat belt classification process if filtered. If the method determines that the seat belt is routed or being worn improperly, then one or more remedial actions can be taken to address the situation. As noted above, the present method does not require weight sensors in the seat, nor does the seat belt have to be marked or otherwise altered, so that the present method can be used in a variety of scenarios with existing vehicle equipment.

Seat belt status determining method 100 may be constantly running in the background when the vehicle 10 is on and/or is being driven, or it may be executed periodically and/or in response to some type of trigger event. For example, after the vehicle is started and an initial seat belt status check has been carried out, the method 100 could then be executed on a periodic basis going forward (e.g., once every second, once every ten seconds, once every minute, etc.). Or, instead of being executed periodically, the method 100 could be executed in response to one or more trigger events (e.g., an unbuckled seat belt is detected, the vehicle is entering a high traffic or high risk area, the vehicle is entering onto a highway, etc.). It should be appreciated that the conditions and/or frequency with which the method 100 is carried out are not limited to the aforementioned scenarios, as other possibilities exist.

The flowchart of FIG. 2 enters at 101 and exits at 127. Beginning with step 110, the method gathers and provides camera image data to the seat belt status determining system 12. For instance, step 110 may use one or more vehicle camera (s) 20-26 mounted inside the vehicle cabin to gather raw camera image data, and provide such data to vehicle data processing module 40 and/or some other component. The camera image data may include a single camera image or frame, multiple camera images or frames (e.g., a burst of images taken by vehicle camera (s) 20-26 over a predetermined amount of time), or video footage, from which one or more image (s) can be extracted. According to a non-limiting example, step 110 gathers camera image data by extracting still images or frames from a video feed at a certain rate (e.g., 5 frames/second). However, the exact frequency with which camera image data is gathered or sampled may vary depending on the particular application and the needs and/or resources thereof. Once the camera image data is gathered and provided, the method may proceed to step 114.

In step 114, the method gathers and provides seat belt data in any of a number of different forms. According to one embodiment, step 114 gathers seat belt data from seat belt sensors 30-36 and provides such data to vehicle data processing module 40 and/or some other component. In conjunction with the camera image data, the seat belt data helps the method determine the precise status or state of a particular seat belt. In its most common use, the seat belt data indicates if a particular seat belt is buckled or not (i.e., if the seat belt tongue is fully inserted into the seat belt buckle). The seat belt data may not, by itself, uncover certain scenarios, such as fake latch plate scenarios or the like; but these scenarios are detectable when the method uses the seat belt data in conjunction with camera image data, as will be explained. The exact frequency with which seat belt data is gathered or sampled may vary depending on the particular application and the needs and/or resources thereof.

Next, the method carries out or performs a seat belt classification process (e.g., a computer vision algorithm), step 118. The seat belt classification process is designed to evaluate a particular seat area and to classify the current status of the passenger and seat belt into one or more classifications, such as: passenger not present, passenger present/seat belt not being worn, passenger present/seat belt being worn improperly, passenger present/seat belt being worn properly, and/or blocked view. According to one example, the seat belt classification process in step 118 receives the camera image data as input and provides a seat belt classification as output, where the seat belt classification classifies an image from the camera image data into one or more classifications (e.g., those listed above). In order for the output of method 100 to be available in real-time or nearly in real-time, all or most of the processing in step 118 would likely need to be carried out at the vehicle 10, such as in one or more of the vehicle electronic modules 40, 50, 60, 70, etc., but this is not required. A non-limiting example of step 118 is shown in the more detailed flowchart of FIG. 3, in which a number of sub-steps 210-258 are illustrated and discussed in the following paragraphs.

Figure 3:
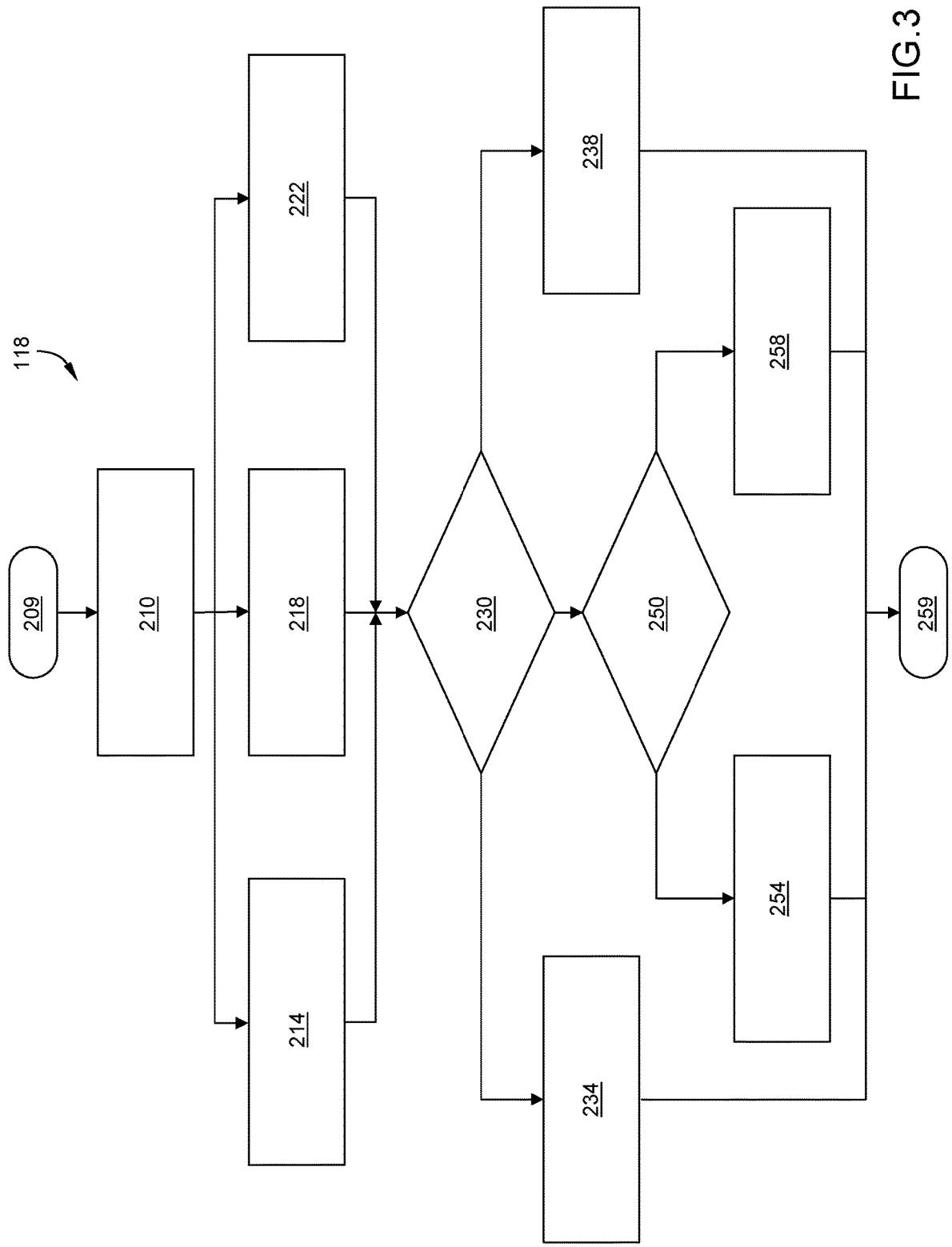
FIG. 3 is a flowchart depicting an embodiment of a seat belt classification process that may be used in the seat belt status determining method of FIG. 2.

The flowchart of FIG. 3 enters at 209 and exits at 259. Starting with step 210 in FIG. 3, the method pre-processes the camera image data and may do so according to any number of different techniques. Step 210 receives the camera image data as input and provides pre-processed camera image data as output, and where the step pre-processes the camera image data by reducing the amount of data involved and/or standardizing the data. For example, in order to reduce the amount of data involved, the pre-processing step 210 may crop a region of interest (ROI) from one of the images, where the ROI corresponds to an expected location of a passenger and seat belt. The size, shape, location, etc. of the ROI can be fixed and predetermined or it can be selected each time based on the contents of that particular image. According to one example, each ROI is greater than or equal to 250×250 pixels and, in one embodiment, is greater than or equal to 300×300 pixels. This way, the method can extract the features within the ROI that it is most interested in and ignore data outside of the ROI that may not be as useful.

As for standardizing the data, pre-processing step 210 may flip images so that they are all in a standard orientation, it may normalize the pixels so that they all have an intensity within a standard range, it may convert the data so that each image has a standard number of bits/pixel, it may scale the images so that they have a standard size, or it may use some other image data standardization technique. By first standardizing the camera image data, the data can be subsequently evaluated in a more uniform or standard fashion. In the standardizing example of flipping images, for instance, step 210 may horizontally flip all of the images on the left side of the vehicle so that their orientation is the same as those images of the right side of the vehicle, or vice-versa. This results in a collection of images having a standard orientation. In a different standardizing example, step 210 may normalize the intensity of the pixels to account for different cameras, lighting conditions, etc. that could make subsequent classification difficult. This technique may be carried out by normalizing the intensity of each pixel I as follows so that all of the pixel intensities are in the range [−1, 1]. For an 8 bit/pixel camera, the following could be used:

$$I\uparrow = ((I/255)-0.5) \times 2$$

Other image processing techniques may also be used. Once step 210 has generated pre-processed camera image data as output, the method proceeds.

In step 214, the method performs a scenario classification process and may do so according to any number of different techniques. According to one example, step 214 receives the pre-processed camera image data as input and provides a scenario classification as output, and this step classifies the images into different scenarios or situations so that the scenario classification output is a statistical prediction of which classification the process believes the image should fall into. For example, the scenario classifier in step 214 may determine, for each pre-processed image, if a passenger is sitting in the seat in question and if a view of the seat area is obstructed or occluded; in this sense, step 214 classifies on an "image-wise" basis. To do this, step 214 may use a scenario classifier that is built offline, but is subsequently installed on the vehicle and is executed each time step 214 is performed. One way to build a scenario classifier is with the use of machine learning techniques, where a model built on sample data or training data can be applied to a new input (e.g., a new pre-processed camera image from step 210), so as to predict the classification of the new input. Machine learning techniques can be particularly suitable for applications, like the scenario classifier in step 214, where it is not feasible to develop an algorithm that can properly address every possible set of circumstances or conditions. Some potential classifications that step 214 may consider include: passenger not present, passenger present, and blocked view. Of course, other classification methods and classifications could be used instead.

Examples of suitable machine learning techniques that could be employed in conjunction with step 214 are supervised deep learning techniques, such as those that are used to build and train a neural network from a large set of sample data or training data. The trained neural network is a model that predicts which scenario classification best represents a particular image. For instance, a supervised learning algorithm could be used to build and train a convolutional neural network that is based on information pertaining to thousands, tens of thousands, hundreds of thousands, or even millions of previously gathered images and their corresponding scenario classifications (i.e., the training data). The neural network is based on a large set of training data that includes a number of individual training examples, each of which includes an individual image and its corresponding classification. Each training example may be expressed as an array or vector, and the training data may be expressed as a matrix. In order to utilize the machine learning techniques explained above, the method must first build and train a neural network (e.g., a deep neural network, a convolutional neural network, etc.). It should be appreciated that much of the discussion for building, training and using a neural network in step 214 will apply to the other steps of method 100 that use neural networks, unless stated otherwise.

The neural network used in conjunction with step 214 is a kind of multi-layer network designed to recognize visual patterns and/or features from pixel information, such as the type that makes up the pre-processed camera images. The neural network is made of a collection of interconnected neurons or nodes, each of which is a mathematical function with one or more input(s) and one or more output(s), where the output of one neuron is used as an input to one or more other neuron(s). A neuron may be connected to multiple neurons in the next layer, but the neuron only outputs a single value for a given set of inputs (thus, the neuron may have "multiple" outputs that all output the same single value). The mathematical function typically includes a linear function and a non-linear function on top of it (also referred to as the activation function). The linear function typically has one or more weights or constants used in the linear function; these weights can be unique to each neuron (although many neurons may be applying the same mathematical function, the different sets of weights are unique and can be "tuned"). Once the neuron receives the input(s) and applies the linear and non-linear functions to the input, a single number is outputted and is referred to as the neuron's activation. The last layer of the neural network may include one neuron for each of the possible classifications or outcomes (e.g., three neurons in step 214; one each for the following classifications: passenger not present, passenger present, or image blocked), where each neuron represents the probability of the image in question belonging to that particular classification. Each neuron in the last layer outputs a single probability value between [0, 1], and the sum of all of the probability values adds up to 1 (the last layer is a probability distribution). This is an example of a multi-class classifier.

Skilled artisans will appreciate that there are a number of ways to build and train a neural network for the purposes listed above, any of which may be used with the present method. According to one non-limiting example of step 214, a convolutional neural network having an Xception type architecture is used, where the convolutional neural network is trained in a supervised manner using a suitable Adam optimization algorithm. Of course, other types of neural network architectures, such as those based on ResNet, VGGNet, AlexNet, Inception, MobileNet, etc., and other types of optimization methods, like plain stochastic gradient descent, AdaGrad, AdaDelta, RMSProp, etc. may be used instead. Through iterative optimization of a function, such as with a loss function like categorical cross entropy, the supervised learning techniques can learn to predict a scenario classification (output) for new pre-processed images (input), even when the new pre-processed images represent a situation not present in the training data. For example, step 214 may train the neural network using a database containing thousands, tens of thousands, or even hundreds of thousands of pre-processed images of seat areas (e.g., at least 10,000 images of seat areas), some of which show seats without passengers, seats with passengers, passengers wearing seat belts, passengers not wearing seat belts, or obstructed views where the status or routing of the seat belt cannot be determined. Skilled artisans in the field of machine learning will appreciate that there are numerous techniques, algorithms, processes, etc. that may be employed to build, train and/or optimize a neural network, including those described below, and that the method is not limited to any particular ones.

One potential technique for training the neural network is an Adam optimization algorithm or Adam optimizer, although this is optional. An Adam optimizer is a type of stochastic gradient descent algorithm or method that can efficiently train the neural network by quickly finding optimal values for each image. Other types of optimization techniques and/or algorithms, including those mentioned above and various examples of gradient descent algorithms, could be used to train the neural network instead. The Adam optimizer may be used in the present context to try and reduce errors by adjusting the weights that are part of the linear function, as explained above. One way to do this is to initially select a random set of weights and then to carry out the optimization process so that the neural network, and hence the model, start out performing poorly but are optimized to perform accurately. The learning rate refers to how much/fast the optimization technique changes the weights between iterations and may be adjusted as needed. The final model will include a collection of weights for the various neurons, where each set of weights has been optimized for accuracy.

Those skilled in the art will appreciate that a number of different techniques may be used to supplement or augment the training data, including any combination of the following techniques. In an image rotation data augmentation technique, the method takes a pre-processed image and its known output (i.e., its known scenario classification) and rotates the image by a random angle in the range of [−30°, 30°]. The rotated image and the same output is then saved as a new training example. An image crop data augmentation technique may also be used, where the method again takes a pre-processed image and its known output, and then purposely crops a section of that image so that a random margin in the range of [0, 25] pixels is discarded. Again, the idea with this data augmentation technique is to generate more training examples so that more possibilities are covered by the model. In yet another example, an image brightness data augmentation technique may be employed, where this technique takes a pre-processed image and its known output and randomly changes the brightness and/or contrast of a random section (e.g., a random quadrilateral) in the image. The weights and/or other parameters of the neural network may be optimized in multiple stages; for instance, the weights and/or parameters for half of the neural network's layers may be optimized first, then those for the other half optimized second, or they could be optimized all together, to cite two possibilities. This process of data augmentation may be repeated any number of times to help supplement and increase the training data by creating new training examples representative of new conditions. Much, if not all, of the aforementioned techniques may be done offline; that is, the neural network may be built and trained at a backend or cloud-based facility before the vehicle is manufactured so that the resulting model can be loaded and saved on the vehicle (e.g., in vehicle data processing module 40) and utilized in step 214.

Step 214 classifies each new pre-processed image (input) and provides a corresponding scenario classification (output). According to the example provided above, step 214 outputs a scenario classification that indicates one of three possible scenarios or situations: a passenger is not present, a passenger is present, or the image has a blocked view. Other potential classifications could be used instead. If the method determines that a passenger is not present in the seat in question, the method may end or loop to the beginning at this point so as to conserve computational resources, etc. (there is no need to try and determine if a seat belt is properly routed if there isn't a passenger in the seat). If the method determines that the image is currently blocked (e.g., an object in front of the camera, the passenger sitting in a position that prevents the camera from being able to see the seat belt, etc.), the method may want to alert the driver/passenger of this occlusion so that it can be resolved. As mentioned above, the neural network or model in step 214 may output a separate probability between [0, 1] for each of the possible classifications, where the sum of all probabilities adds up to 1. The output with the highest probability is then deemed the most likely scenario. The scenario classification output will be considered by the method, along with the output of steps 218 and 222, as explained below.

In step 218, the method performs a seat belt segmentation process and may do so in any number of different ways. According to one example, step 218 receives the pre-processed camera image data as input and provides a segmented seat belt as output, where the segmented seat belt output includes a collection of pixels that have been recognized by the process as being part of the seat belt in question. Put differently, step 218 evaluates a pre-processed camera image and, on a pixel-by-pixel or group of pixels-by-group of pixels basis, determines which pixels correspond to the seat belt in the image and which do not. This output can subsequently be used to analyze the seat belt routing and to determine if it is proper or improper, as will be explained. In this sense, step 218 segments or evaluates on a "pixel-wise" basis, as opposed to step 214 which evaluated on an "image-wise" basis. To do this, step 218 may use a seat belt segmenter or pixelizer that is built offline, but is subsequently installed on the vehicle and is executed each time step 218 is performed. One way to build a seat belt segmenter is with the use of machine learning techniques, such as the supervised deep learning techniques described above, where a model built on sample data or training data is applied to a new input (e.g., one or more pixel(s) from a new pre-processed camera image from step 210), so as to predict whether or not the pixel(s) in question are part of the seat belt or correspond to some other item (e.g., the passenger, the seat, background objects, etc.). Machine learning techniques can be particularly suitable for applications, like the seat belt segmenter in step 218, where it is not feasible to develop an algorithm that can properly address every possible set of circumstances or conditions.

According to one non-limiting example of step 218, a fully convolutional neural network having a DenseNet type architecture is used, where the fully convolutional neural network is trained in a supervised manner using a suitable optimization algorithm. Of course, other types of neural network architectures, such as those listed above or SegNet, U-Net, DeepLab, etc., may be used instead. Through iterative optimization of a function, which will be a different function than that used above in the scenario classification process, the supervised learning techniques can learn to generate a segmented seat belt (output) for new pre-processed images (input), even when the new pre-processed images represent a situation not present in the training data. For example, step 218 may train the neural network using a database containing thousands, tens of thousands, or even hundreds of thousands of pre-processed images of seat belts (e.g., at least 10,000 images of seat belts) which show passengers wearing seat belts in various configurations, passengers not wearing seat belts, passengers wearing seat belts that are partially obstructed so that portions of the seat belt are visible while others are obstructed, passengers wearing seat belts where the lower or lap belt and the upper or shoulder belt are separately visible, etc. Skilled artisans in the field of machine learning will appreciate that there are numerous techniques, algorithms, processes, etc. that may be employed to build, train and/or optimize a neural network, including those described above, and that the method is not limited to any particular ones.

In step 222, the method performs a passenger pose estimation process and may do so according to any of a variety of different ways. According to one example, step 222 receives the pre-processed camera image data as input and provides a passenger pose estimation as output, where the passenger pose estimation output includes information pertaining to the estimated location of certain passenger body parts, such as key joints and features (e.g., knees, hips, shoulders, elbows, wrists, neck, forehead, eyes, ears, etc.). By knowing the location of the seat belt (e.g., from the segmented seat belt output) and the location of certain body parts (e.g., from the passenger pose estimation output), the method will be able to determine if the seat belt is properly routed across the body of the passenger, as will be explained. To do this, step 222 may use a pose estimator that is built offline, but is subsequently installed on the vehicle and is executed each time step 222 is performed. One way to build a pose estimator is with the use of machine learning techniques, such as the supervised deep learning techniques described above, where a model built on sample data or training data is applied to a new input (e.g., a new pre-processed camera image from step 210 showing a passenger in a certain pose or posture), so as to estimate the location of certain body parts. Machine learning techniques can be particularly suitable for applications, like the pose estimator in step 222, where it is not feasible to develop an algorithm that can properly address every possible set of circumstances or poses.

In one example of step 222, a convolutional neural network having a convolutional pose machine type architecture is used, where the convolutional neural network is trained in a supervised manner using a suitable optimization algorithm. Of course, other types of neural network architectures, such as those listed above or a cascaded pyramid network, may be used instead. Through iterative optimization of a function, which will be a different function than that used above in the scenario classification process, the supervised learning techniques can learn to generate a passenger pose estimation (output) for new pre-processed images (input), even when the new pre-processed images represent a situation not present in the training data. For instance, step 222 may train the neural network using a database containing thousands, tens of thousands or even hundreds of thousands of pre-processed images of passengers in different poses (e.g., at least 10,000 images of passenger poses) which show different size passengers, passengers sitting in different orientations (e.g., with arms and/or legs crossed, with arms and/or legs straight, with head tilted, with head straight, with shoulders drooped, with shoulders square, etc.). Skilled artisans in the field of machine learning will appreciate that there are numerous techniques, algorithms, processes, etc. that may be employed to build, train and/or optimize a neural network, including those described above, and that the method is not limited to any particular ones.

In a sense, the passenger pose estimation or output of step 222 is a digital representation or virtual model of certain body parts of the passenger in question, where the virtual model includes locations of the body parts and/or connections between such body parts. Information pertaining to the neck and shoulders, such as their estimated location, orientation, size, shape, etc., may be of particular interest to the passenger pose estimation process. With this virtual model of the passenger pose or posture, the method will be able to later determine if the seat belt routing is proper or improper. It should be appreciated that all of the discussion above concerning machine learning techniques, including that directed to building, training and using neural networks, data augmentation techniques, etc. may apply to step 222 as well. Once the passenger pose estimation process is complete, the method proceeds.

At this point, steps 230-258 receive the output from steps 214-222 and determine a seat belt classification for the image in question. In one example of step 230, the method uses the scenario classification output from step 214 to determine if a passenger is present; if a passenger is not present, then step 234 classifies the image as "passenger not present." If a passenger is present, then step 230 may again use the scenario classification output from step 214 to determine if the image being analyzed or evaluated has a blocked view, where the passenger and/or the seat belt is blocked or otherwise obstructed from view such that method cannot make a determination. If this is the case, then step 238 may classify the image as "blocked view." If step 230 determines that a passenger is present and that the view is not blocked, then the method may proceed to step 250.

In step 250, the method determines if the seat beat is properly routed on the passenger. For example, step 250 may overlay, superimpose and/or otherwise compare the segmented seat belt output from step 218 with the passenger pose estimation from step 222 in order to determine if a portion of the seat belt (e.g., a torso portion of the upper or shoulder belt) extends between the neck and shoulder of the passenger. There are numerous ways in which this comparison or evaluation could be carried out. In one such example, the binary image that is outputted by the segmented seat belt process (i.e., the segmented seat belt), is traversed pixel by pixel from the shoulder location to the neck location. If any of these pixels is marked as belonging to the seat belt, then the routing is proper; if not, the routing is improper. Step 250 may determine if a lower or lap belt portion of the seat belt extends across the passenger's hip or waist, and this may be done in addition to or in lieu of the neck and shoulder evaluation. Of course, other techniques and methods for determining proper seat belt routing from the output of steps 214-222 may be used instead. If the method determines that the seat belt is being properly worn or routed, then step 254 may classify the image as "passenger present/seat belt being worn properly." Conversely, if the method determines that the seat belt is being worn or is routed improperly, then step 258 may classify the image as "passenger present/seat belt being worn improperly." It is also possible for one or more of steps 230-258 to use the seat belt data from seat belt sensors 30-36 to determine if the seat belt is fully buckled or inserted. This information may be used in addition to the steps described above as a separate seat belt status check, or according to some other embodiment. These classification and/or other output from the seat belt classification process in step 118 could be saved in any suitable memory device on the vehicle or elsewhere, such as at a cloud-based facility.

Turning back to FIG. 2 now that step 118 has finished, the method proceeds to step 122 to filter the output of the seat belt classification process. Any number of different filtering, averaging and/or other techniques may be used to confirm or verify the seat belt classification status. A non-limiting example of such a technique involves temporal integration, where the output of one or more of the preceding steps is integrated or filtered over time so as to reduce noise and/or spurious outputs. If step 118 outputs a seat belt classification output (e.g., a numerical output representative of the different classifications) for each frame of the camera image data, then step 122 may filter this output by temporally integrated the output of step 118 over a certain period of time or number of frames (e.g., over 5, 10, 50 frames, etc.). Before changing the seat belt classification from one status to another, step 122 may require that the changed status not be just momentary, but be sustained, as shown by the results of the temporal integration. Skilled artisans will appreciate that other filtering, integration and/or other techniques may be used instead.

Lastly, step 126 may carry out remedial actions for certain seat belt classifications. For instance, if the method determines that the seat belt classification is a "blocked view," such as in step 238, the method may send a visual and/or audible alert to the passenger asking them to remove the obstruction. If, for example, the method determines that the seat belt classification corresponds to "passenger present/seat belt being worn improperly," such as in step 258, then step 126 may send a visual and/or audible alert to the passenger (e.g., dashboard chime and light, similar to current seat belt warnings) asking them to remedy the situation by adjusting the seat belt, etc. In the context of autonomous or semi-autonomous vehicles, the method may employ a scalation method that begins with visual and/or audible alerts to the passenger, followed by warnings that the vehicle will stop driving if not remedied within a certain amount of time. If the seat belt status does not change, then step 126 may use the vehicle autonomous driving module 60 to automatically bringing the vehicle to a safe stop until the passenger satisfactorily remedies the seat belt status (i.e., ensures that the seat belt is buckled and properly routed). Once this happens, the autonomous or semi-autonomous vehicle may continue on its route. Other remedial measures are certainly possible.

Although method 100 has been illustrated with a certain sequence of steps, it should be appreciated that the exact order or sequence of these steps may vary. For example, it is possible for the method to gather camera image data and/or seat belt data before, after or during the execution of the other method steps. In a different example, step 118 may be structured so that the method ends if step 234 determines that no passenger is present or if step 238 determines that the image is blocked. The present method is not limited any particular sequence or combination of steps, and the present method may include more, less or different steps than those shown and described.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A seat belt status determining method for use with a vehicle having one or more vehicle camera(s) and one or more seat belt sensor(s), the method comprising the steps:
gathering camera image data with the vehicle camera(s);
gathering seat belt data with the seat belt sensor(s) indicative of a latch state of a seat belt;
performing a scenario classification process comprising a convolutional neural network, the scenario classification process receives pre-processed camera image data as input and provides a scenario classification as output, the scenario classification process classifies an image from the pre-processed camera image data into one or more classification(s) that are representative of a passenger not present, a passenger present, or a blocked view;
determining using the scenario classification output a passenger is present in the image;
in response to determining the passenger is present in the image, determining using the scenario classification output the image does not have a blocked view; and
in response to 1) determining the passenger is present and 2) determining the image does not have a blocked view, determining the seat belt is being properly worn by the passenger based upon a determination that the seat belt is properly routed and the latch state of the seat belt.

2. The method of claim 1, wherein the camera image data gathering step further comprises gathering camera image data with the vehicle camera(s) and providing the camera image data to a vehicle data processing module over a vehicle communications network, the camera image data includes images that show a seat area in a cabin of the vehicle.

3. The method of claim 1, wherein the seat belt data gathering step further comprises gathering seat belt data with the seat belt sensor(s) and providing the seat belt data to a vehicle data processing module over a vehicle communications network, the seat belt data includes signals that indicate whether a seat belt is buckled or not buckled.

4. The method of claim 1, wherein the performing step further comprises performing the seat belt classification process by pre-processing the camera image data so that the pre-processed camera image data is reduced in size and is standardized.

5. The method of claim 4, wherein the pre-processing step further comprises reducing the size of camera image data by cropping a region of interest (ROI) from an image in the camera image data, where the ROI corresponds to an expected location of a passenger and seat belt.

6. The method of claim 4, wherein the pre-processing step further comprises standardizing the camera image data by performing one or more standardization technique(s) selected from the list consisting of: horizontally flipping one or more image(s) so that they have a standard orientation, normalizing pixels so that they have an intensity within a standard range, converting data for one or more image(s) so that they have a standard number of bits/pixel, or scaling one or more image(s) so that they have a standard size.

7. The method of claim 1, wherein the convolutional neural network predicts which of the scenario classification(s) best represents the image from the pre-processed camera image data and does so on an image-wise basis.

8. The method of claim 7, wherein the scenario classification output includes a plurality of probability values, each of the probability values is between [0, 1] and represents a probability that the image from the pre-processed camera image data is representative of a particular scenario, and the sum of the probability values for all of the possible scenarios equals 1.

9. The method of claim 7, wherein the convolutional neural network comprises an Xception type architecture and is trained using an Adam optimizer.

10. The method of claim 7, wherein the scenario classification process further comprises using one or more data augmentation technique(s) to supplement training data for the convolutional neural network, the data augmentation technique(s) includes one or more technique(s) selected from the list consisting of: an image rotation data augmentation technique, an image crop data augmentation technique, or an image brightness data augmentation technique.

11. The method of claim 1, wherein the performing step further comprises performing the seat belt classification process which includes a seat belt segmentation process, the seat belt segmentation process receives pre-processed camera image data as input and provides a segmented seat belt as output, the seat belt segmentation process identifies a plurality of seat belt pixels from an image in the pre-processed camera image data.

12. The method of claim 11, wherein the seat belt segmentation process further comprises using a neural network to predict if each pixel or group of pixel(s) in the image corresponds to a seat belt or not and does so on a pixel-wise basis.

13. The method of claim 11, wherein the segmented seat belt output is a binary image where each of the pixel(s) is assigned a "0" or "1" depending on whether or not it is a seat belt pixel.

14. The method of claim 11, wherein the neural network is a fully convolutional neural network having a DenseNet type architecture.

15. The method of claim 1, wherein the performing step further comprises performing the seat belt classification process which includes a passenger pose estimation process, the passenger pose estimation process receives pre-processed camera image data as input and provides a passenger pose estimation as output, the passenger pose estimation process estimates a location of one or more passenger body part(s) in an image in the pre-processed camera image data.

16. The method of claim 15, wherein the passenger pose estimation process further comprises using a neural network to estimate the location of the body part(s) in the image.

17. The method of claim 1, wherein the performing step further comprises performing the seat belt classification process which includes both a seat belt segmentation process and a passenger pose estimation process, the seat belt segmentation process outputs a segmented seat belt that includes a plurality of seat belt pixels, the passenger pose estimation process outputs a passenger pose estimation that estimates a location of one or more passenger body part(s), and wherein the seat belt classification process compares the plurality of seat belt pixels to the estimated location the passenger body part(s) and, when a portion of the seat belt extends between a neck and shoulder of the passenger body part(s), the seat belt classification process determines that a passenger is present and the seat belt is being worn properly.

18. The method of claim 1, wherein the seat belt classification process classifies the image from the camera image data into one or more classification(s) selected from the list consisting of: passenger not present, blocked view, passenger present/seat belt being worn properly, or passenger present/seat belt being worn improperly.

19. The method of claim 1, further comprising the step of: carrying out one or more remedial action(s) when the seat belt classification process determines that a passenger is present but the seat belt is being worn improperly, the remedial action(s) is selected from the list consisting of: sending a visual alert to the passenger, sending an audible alert to the passenger, or automatically stopping the vehicle when the vehicle is an autonomous or semi-autonomous vehicle.

* * * * *